US010471772B2

(12) United States Patent
El Khalki et al.

(10) Patent No.: US 10,471,772 B2
(45) Date of Patent: Nov. 12, 2019

(54) TYRE CHAMBER

(71) Applicant: DECATHLON, Villeneuve d'Ascq (FR)

(72) Inventors: Jaouad El Khalki, Lezennes (FR); Gabin Delannoy, Cysoing (FR); Eric Bretaudeau, La Madeleine (FR)

(73) Assignee: DECATHLON, Villeneuve d'Ascq (FR)

( * ) Notice: Subject to any disclaimer, the term of this patent is extended or adjusted under 35 U.S.C. 154(b) by 542 days.

(21) Appl. No.: 14/894,352

(22) PCT Filed: May 22, 2014

(86) PCT No.: PCT/FR2014/051199
§ 371 (c)(1),
(2) Date: Nov. 26, 2015

(87) PCT Pub. No.: WO2014/191660
PCT Pub. Date: Dec. 4, 2014

(65) Prior Publication Data
US 2016/0114628 A1    Apr. 28, 2016

(30) Foreign Application Priority Data
May 28, 2013   (FR) ...................................... 13 54779

(51) Int. Cl.
*B60C 5/04*      (2006.01)
*B29D 23/24*    (2006.01)
(Continued)

(52) U.S. Cl.
CPC ................ *B60C 7/10* (2013.01); *B29D 23/24* (2013.01); *B60C 7/12* (2013.01); *B60C 17/06* (2013.01); *B60C 5/10* (2013.01); *B60C 2200/12* (2013.01)

(58) Field of Classification Search
CPC .... B60C 5/00; B60C 5/02; B60C 5/04; B60C 5/08
See application file for complete search history.

(56) References Cited

U.S. PATENT DOCUMENTS

| 5,383,715 A | 1/1995 | Homma et al. |
| 5,394,897 A | 3/1995 | Ritchey |
| 2004/0238021 A1 | 12/2004 | Holub et al. |

FOREIGN PATENT DOCUMENTS

| CN | 87217119 U | 10/1988 |
| CN | 1069233 A | 2/1993 |

(Continued)

OTHER PUBLICATIONS

First Office Action dated May 5, 2016, Chinese Application No. 2013800598396, pp. 1-18 (Including English Translation).

*Primary Examiner* — Justin R Fischer
(74) *Attorney, Agent, or Firm* — MH2 Technology Law Group, LLP

(57) ABSTRACT

The invention relates to a toroidal inner tube (30, 130). The invention is characterized by the fact that the inner tube (30, 130) is in the form of a flexible corrugated tube (40, 140) that is curved to form a closed loop, the tube comprising alternating crest rings (46, 146) and trough rings (48, 148), the tube presenting a radius (R) and, when measured in a plane perpendicular to the axis of the tube, the radial thickness of at least one of the crest rings is less than the radial thickness of at least one of the trough rings (48, 148).

20 Claims, 5 Drawing Sheets

(51) Int. Cl.
*B60C 7/10* (2006.01)
*B60C 17/06* (2006.01)
*B60C 7/12* (2006.01)
*B60C 5/10* (2006.01)

(56) References Cited

FOREIGN PATENT DOCUMENTS

| | | | |
|---|---|---|---|
| CN | 2181540 Y | | 11/1994 |
| CN | 1597372 A | | 3/2005 |
| CN | 202834428 U | | 3/2013 |
| DE | 202933 C | | 8/1907 |
| DE | 3230812 A1 | | 2/1984 |
| FR | 449531 A | | 3/1913 |
| GB | 191221272 A | | 4/1913 |
| GB | 407614 | * | 3/1934 |
| JP | 11-59119 | * | 3/1999 |
| JP | 2004-52870 | * | 2/2004 |
| JP | 2007-268906 | * | 10/2007 |
| WO | 2011/018664 A1 | | 2/2011 |

* cited by examiner

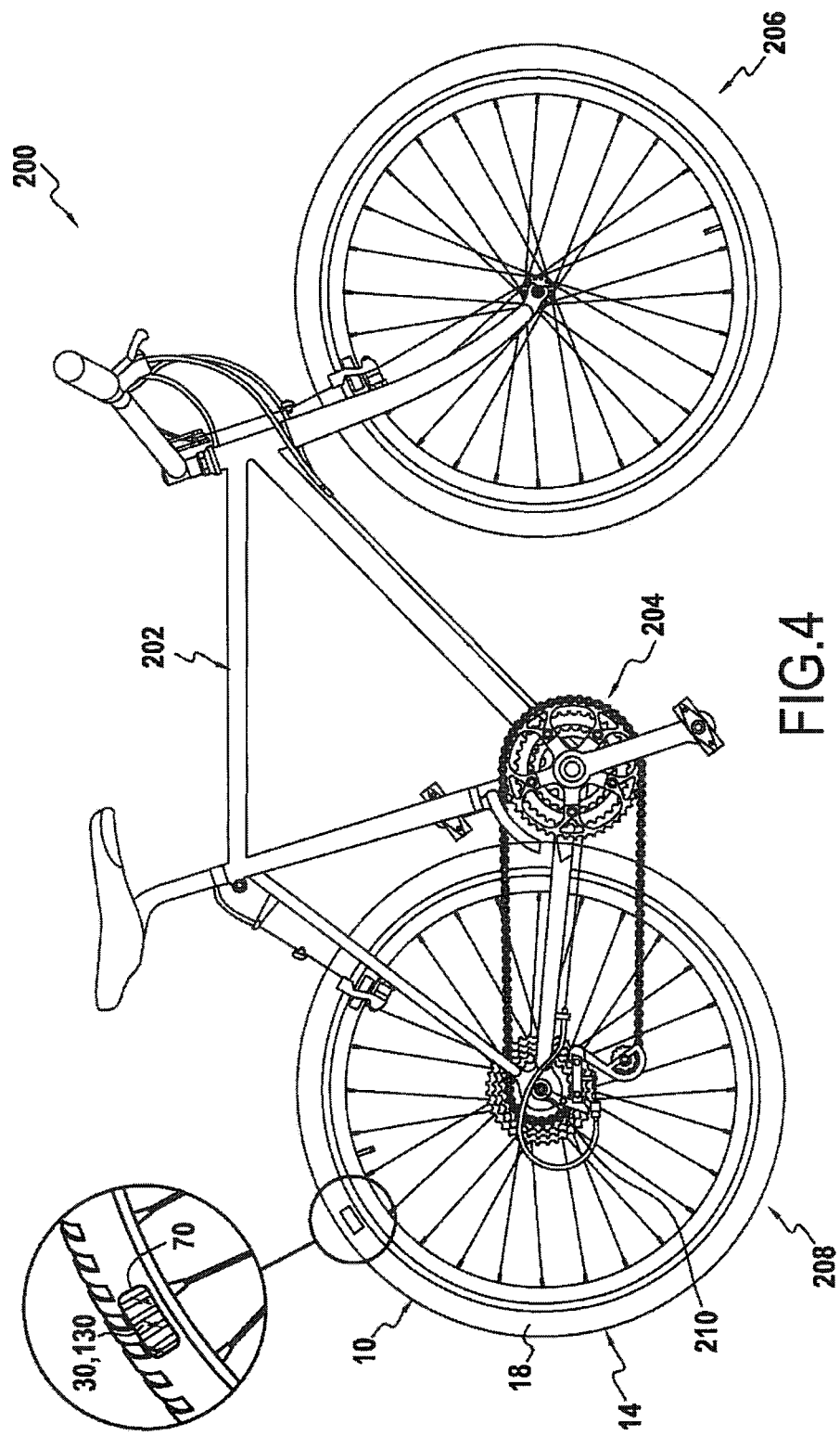

TYRE CHAMBER

BACKGROUND OF THE INVENTION

The present invention relates to an inner tube. A particular application lies in being mounted in the running device of a wheel, e.g. and in non-limiting manner, for fitting to a vehicle such as a bicycle.

A wheel is known that includes an inflatable inner tube inside an internal housing of a tire, such a wheel presenting weight and flexibility that enable the vehicle to move.

Nevertheless, the problem posed by that type of wheel is that is needs numerous maintenance operations. Indeed, because of the porosity of the material constituting the inflatable inner tube, the user must regularly reestablish its internal pressure. In addition, in the event of the wheel striking a sharp element, such as the edge of a sidewalk, or coming into contact with a pointed object, such as a spike, the inner tube can be punctured, requiring it to be repaired or indeed the wheel to be replaced.

An alternative solution to using an inflatable inner tube is proposed in Document GB 1912 21 272, which describes a wheel having first and second open tubes, the first tube being arranged inside the second tube, and both tubes being fastened by rivets of the rim of the wheel. Although that solution solves the drawbacks associated with the risk of puncture, it requires difficult operations for mounting the tubes on the wheel; in addition, the absence of a pneumatic configuration compromises the comfort and the safety in use of the vehicle on which the wheel is mounted.

OBJECT AND SUMMARY OF THE INVENTION

An object of the present invention is to provide a wheel that does not require numerous maintenance or installation operations to be performed, the wheel in particular being incapable of being punctured, and enabling the vehicle to move in comfortable and safe manner, benefiting from energy restitution that makes it possible to limit the forces exerted by the user in order to set the vehicle into motion.

This object is achieved by the fact that the invention provides a toroidal inner tube made from a flexible corrugated tube that is curved into a closed loop.

Thus, the device can replace the inflatable inner tube that is normally used, and there is no need for the pressure inside the inner tube of the present invention to be regularly restored, nor is there any risk of the inner tube being punctured.

The cylindrical shape of the tube enables it to adapt to various types of running device, such as tires, without requiring modifications to the wheel. It also serves to fill the wheel it equips appropriately, by presenting, among other things, characteristics in terms of comfort and energy restitution that are similar or even better than those of an inflated inner tube.

The term "tube" is used to designate an element that is made up either as a single piece or by assembling together a plurality of portions that are fastened to one another, e.g. by mutual engagement, by adhesive, or by other means.

The term "corrugated tube" is used to mean either a tube in which distinct substantially mutually parallel rings are formed, or a tube presenting extra thicknesses of material formed on its outside surface and winding in substantially helical manner around the tube.

It should be understood that the term "cylinder" is used to mean a surface defined by a straight line sweeping around a closed plane curve; it can thus be understood that the cylindrical tube of the present invention does not necessarily present a section that is circular, but could by way of example and in non-limiting manner present a section that is elliptical.

The invention is set out below in a series of variant embodiments that may be considered singly or in combination with one or more of the preceding embodiments.

Advantageously, the tube comprises alternating crest rings and trough rings.

The corrugated shape of the tube enables it to be curved easily so that it can form a closed loop and constitute an inner tube of toroidal shape.

In addition, the alternating crest rings and trough rings make it possible to reduce the impact of the deformations to which the inner tube is subjected during travel of the vehicle running on a wheel that is fitted with the tube. It also enables the inner tube to conserve a deployed shape and to withstand the flattening force that is applied to the wheel by the weight of the vehicle, possibly together with the weight of its user.

Advantageously, the tube presents a radius, and each trough ring defines an annular groove that presents a radial depth.

Preferably, but not necessarily, the radial depth of at least one of the trough rings varies around the circumference of the tube.

By means of this characteristic, the inner tube presents flexibility characteristics that are appropriate for the stresses to which it is going to be subjected. Indeed, the portion of the inner tube arranged facing the contact surface of the running device is not subjected to the same stresses as the portion of the inner tube that is diametrically opposite thereto, nor is it subjected to the same stresses as those to which the lateral portions of the inner tube are subjected.

Advantageously, when measured in a plane that is transverse, and preferably perpendicular, to the axis of the tube, at least one of the trough rings presents a shape that is oval.

By this provision, the section of the trough ring presents one axis of symmetry, or two axes of symmetry.

Advantageously, the radial depth of at least one of the trough rings varies between a maximum radial depth and a minimum radial depth, at least one of the maximum and minimum radial depths being reached at at least two distinct positions around the circumference of the tube.

Advantageously, each of the maximum and minimum radial depths is reached at at least two distinct circumferential positions around the tube.

Preferably, the two distinct positions of the trough ring where the minimum radial depth is reached are diametrically opposite.

Advantageously, the two distinct positions of the trough ring where the maximum radial depth is reached are not diametrically opposite.

By means of these various possible behaviors for variation in the radial depth of the trough ring around the circumference of the tube, its flexibility, energy restitution, and flattening resistance properties, among others, can be optimized as a function of the type of vehicle on which the wheel including the inner tube is to be mounted, and also as a function of the use to which the vehicle is put, the environment in which the vehicle is to travel, characteristics of the user, . . . .

Advantageously, when measured in a plane that is transverse, and preferably perpendicular, to the axis of the tube, the radial thickness of at least one of the crest rings varies around the circumference of the tube.

By this provision, the properties of the crest ring, and in particular its flexibility, vary around the circumference of the tube, thereby enabling it to adapt to the various stresses to which it is to be subjected.

Preferably, the radial thickness of the crest ring varies between a maximum radial thickness and a minimum radial thickness, the maximum radial thickness being reached at at least one of the circumferential positions of the tube where the minimum radial depth of the trough ring is reached.

Advantageously, each of the maximum and minimum radius thicknesses is reached at at least two distinct positions around the circumference of the tube.

Advantageously, the minimum radial thickness of the crest ring is reached at at least one of the circumferential positions of the tube where the maximum radial depth of the trough ring is reached.

Advantageously, the radial thickness of at least one trough ring is greater than the radial thickness of at least one crest ring.

By this provision, the energy conservation properties and the comfort felt by the user are further improved: the stiffness of the inner tube is increased so as to limit losses of the energy delivered by the user in order to set the vehicle into motion, where at least one of the travel means of the vehicle includes an inner tube of the present invention, but without compromising the utilization comfort felt by the user.

Preferably, the trough ring and the crest ring under consideration are contiguous.

By this provision, starting from a right cylindrical tube of constant radial thickness, the trough rings and the crest rings may be formed so that their respective radial thicknesses and radial depths vary around the circumference of the tube.

In other words, the material from which the cylindrical tube is made is subjected during formation of the crest and trough rings to deformations of different magnitudes around the circumference of the tube so as to form firstly positions around the circumference of the tube where the maximum radial depth of the trough ring and the minimum radial thickness of the crest ring are reached simultaneously, and secondly positions around the circumference of the tube where the minimum radial depth of the trough ring and the maximum radial thickness of the crest ring are reached simultaneously.

Advantageously, when measured in a plane perpendicular to the axis of the tube, the radial thickness of at least one of the trough rings varies around the circumference of the tube.

In a manner that is advantageous but not essential, the radial thickness of the trough ring varies around the circumference of the tube in a manner similar to the radial thickness of one of the crest rings adjacent to the trough ring.

In other words, the minimum and maximum radial thickness of the trough ring are reached at the same positions around the circumference of the tube as the positions in which the minimum and maximum radial thicknesses respectively of one of the crest rings that is located contiguously with the trough ring are also reached.

These various provisions make it possible to simplify fabrication of the corrugated tube, without compromising the match between the properties of the trough rings and of the crest rings with the stresses to which the tube is subjected.

Preferably, when measured in a plane containing the axis of the tube, the periphery of at least one of the crest rings is substantially flat.

By this provision, the peripheries of the crest rings come into contact against the inside surface of the running device having the inner tube inserted into its internal housing.

Advantageously, when measured in a plane containing the axis of the tube, the section of at least one of the trough rings is rounded.

By this provision, it is ensured that the corrugated tube is flexible, the trough rings arranged on either side of a trough ring being capable of moving towards and away from each other in alternation as a function of the stresses to which the inner tube is subjected.

Advantageously, when measured in a plane containing the axis of the tube, the axial length of the periphery of at least one of the crest rings is strictly greater than the axial length of the groove of at least one of the trough rings.

By this provision, contact is ensured between the peripheries of the crest rings and the inside surface of the running device having the inner tube inserted in its internal housing, regardless of the radius of curvature of the inner tube.

Preferably, the tube is made of thermoplastic elastomer (TPE).

Advantageously, the thermoplastic elastomer is a thermoplastic copolyester or an ether-ester block copolymer.

The use of this material makes it possible simultaneously to reconcile the looked-for flexibility and strength characteristics of the tube with the constraints of complexity and cost of fabrication.

Advantageously, the inner tube is not inflatable.

By this provision, the user has no need regularly to reestablish the internal pressure of the inner tube, nor to repair any punctures that might occur; the inner tube thus presents durability that is greater than that of the inflatable inner tubes that are used conventionally for placing in the tire of a wheel. It can be understood that the inner tube of the present invention also presents ecological and economic advantages.

Preferably, the invention also provides a wheel configured for mounting on a vehicle, such as a bicycle, the wheel comprising:

a running device comprising a contact surface configured to come into contact with the ground during travel of the vehicle, and defining an internal housing; and an inner tube of the present invention the inner tube being arranged in the internal housing of the running device.

Advantageously, one of the circumferential positions of the trough ring where the minimum radial depth is reached is arranged facing the contact surface of the running device.

In advantageous manner, one of the circumferential positions of the crest ring where the maximum radial thickness is reached is placed facing the contact surface of the running device.

These provisions serve in particular to improve the utilization comfort of the vehicle, and also its energy restitution.

Preferably, the running device includes a first lateral margin and a second lateral margin extending from the contact surface, an inspection port being formed in either one of the first and second lateral margins of the running device.

Advantageously, first and second inspection ports are formed respectively in the first and second lateral margins, the first and second inspection ports being arranged facing each other.

The presence of the inspection port makes it possible from outside the wheel to see the inner tube arranged in the internal housing of the running device. In addition to advantages associated with regulating the temperature of the internal housing of the running device, the inspection port also presents an advantage in terms of appearance, and also makes it possible to verify that the inner tube is indeed installed in the running device of the wheel.

In addition, the inspection port is formed in the lateral margin so it does not compromise the strength of the running device, nor its ability to withstand the stresses to which it is subjected, nor the grip of the wheel on the ground.

Advantageously, the wheel also includes a protective sleeve arranged around the tube of the inner tube and arranged facing the inspection port.

By this provision, the portion of the inner tube that is visible through the inspection port cannot be damaged from outside the wheel.

Advantageously, the tube forming the inner tube has first and second longitudinal ends and the protective sleeve has a closed first end, the protective sleeve being arranged at the first longitudinal end of the tube, the closed first end being arranged against the second longitudinal end.

The protective sleeve can thus be installed quickly and easily on the inner tube, without compromising co-operation between the first and second longitudinal ends, where such co-operation is necessary for enabling the inner tube to fully occupy the running device.

The protective sleeve is preferably made of a transparent material.

Such a material ensures that the tube of the inner tube can be seen from outside the wheel.

BRIEF DESCRIPTION OF THE DRAWINGS

Other characteristics and advantages of the invention appear more clearly and more completely on reading the following description of two preferred embodiments, given as non-limiting examples and with reference to the following accompanying drawings, in which:

FIG. 4 is a diagrammatic view of an example vehicle having the wheel of the present invention installed thereon.

DETAILED DESCRIPTION OF THE INVENTION

Figure 1A:
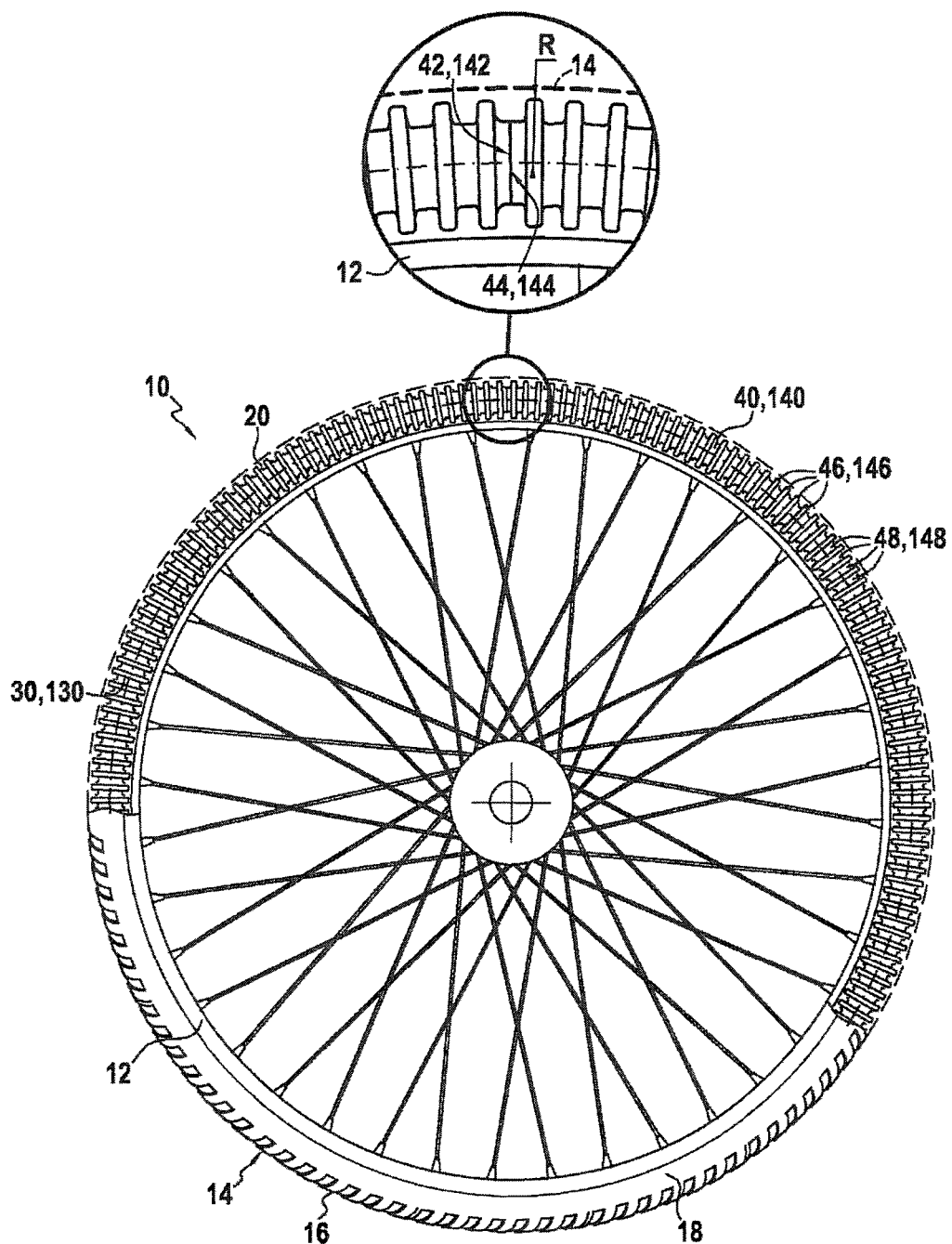
FIG. 1A is a partially cutaway diagrammatic view of an example of a wheel of the present invention.

In the example shown in FIG. 1A, the wheel 10 of the present invention comprises in conventional manner a rim 12 and a running device 14 such as a tire, for example.

The running device 14 presents a contact surface 16 on which shapes in relief may be formed, by way of example and in non-limiting manner, in order to improve grip between the wheel and the ground; in addition, the running device 14 includes a first lateral margin 18 and a second lateral margin, both of which extend from the contact surface 16 to the rim 12.

The running device 14 is mounted on the rim 12 in such a manner that the contact surface 16 and the first lateral margin 18 and the second lateral margin define an internal housing 20 containing an inner tube 30, 130.

As shown in particular in detail in FIG. 1A, where the running device 14 is shown in dashed lines, the inner tube 30, 130 is arranged between the inside face of the contact surface 16 and the periphery of the rim 12.

The term "inside face" is used of the contact surface 16 to designate the face opposite from its face that is to come into contact with the ground.

The inner tube 30, 130 is toroidal in shape and, in this example, it is made from a corrugated tube 40, 140 that is cylindrical of radius R, and that is curved so as to form a loop.

As shown in FIG. 1A, the tube 40, 140 has a first end 42, 142 and a second end 44, 144 opposite from its first end; the initially straight tube 40, 140 is curved and looped so as to form an open torus, such that the first and second ends 42, 44; 142, 144 come into contact against each other.

It can thus be seen that when the tube 40, 140 is in a closed loop, the first and second ends 42, 44; 142, 144 are in contact with each other of the plane-against-plane type. Such contact of the ends against each other thus enables the tube to be looped, the tube being held between the inside face of the contact surface of the running device 14 and the periphery of the rim 12.

It can thus be understood that the tube 40, 140 can alternate between a straight-line state in which it presents a longitudinal axis A, shown in the following figures, and a curved state, in which it forms an open torus.

The tube 40, 140 is made up of an alternation of crest rings 46, 146 and of trough rings 48, 148.

As can be seen in the various figures, the portions of the tube 40, 140 connecting together two successive rings are rounded, so as to avoid forming sharp edges that might compromise use of the tube 40, 140.

As shown in FIG. 1A, the first and second ends 42, 44; 142, 144 are constituted by trough ring portions 48, 148.

Figure 1B:
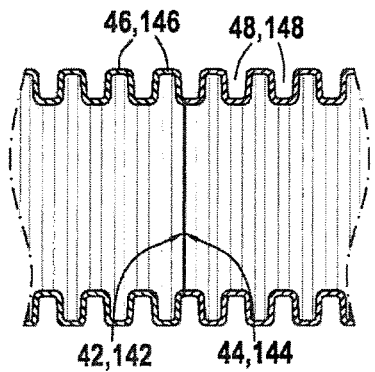
FIGS. 1B, 1C, and 1D are diagrams showing the first and second ends of alternative embodiments of the inner tube of the tire of the present invention.

Without going beyond the ambit of the present invention, and as shown in FIG. 1B, it would naturally be possible to devise a tube 40, 140 in which the first and second ends 42, 44; 142, 144 are constituted respectively by a crest ring portion 46, 146 and by a trough ring portion 48, 148. This configuration causes contact between the two ends of the tube to be further improved with the end constituted by a trough ring portion 48, 148 bearing against the surface defined by the crest ring portion 46, 146 constituting the other end.

Alternatively, and without going beyond the ambit of the present invention, the first and second ends 42, 44; 142, 144 may be constituted by two crest ring portions 46, 146 so as to further improve contact between the two ends.

Figure 1C:
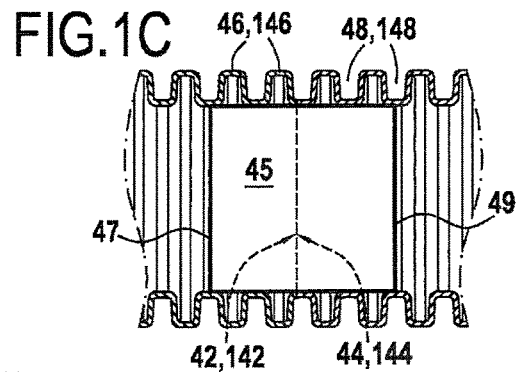

Furthermore, and as shown in FIG. 1C, it is also possible to provide for there to be a closure element 45 arranged in the inside volume of the tube 40, 140 and configured to further improve contact between the first and second ends 42, 44; 142, 144 when the tube 40, 140 is looped. By way of example and in non-limiting manner, the closure element 45 comprises a tube segment of section that is equal to or slightly greater than the inside section of the tube 40, 140, the closure element 45 also including first and second ends 47 and 49 that are embedded or fastened by any other means in the first and second ends 42, 44; 142, 144 respectively of the tube 40, 140. The closure element 45 may thus be engaged by force in the tube 40, 140; it could also optionally be fastened, e.g. by means of adhesive, in the inside volume of the tube 40, 140. The closure element 45 is thus configured to further improve contact between the ends of the tube 40, 140 when the tube is in a closed loop.

Figure 1D:
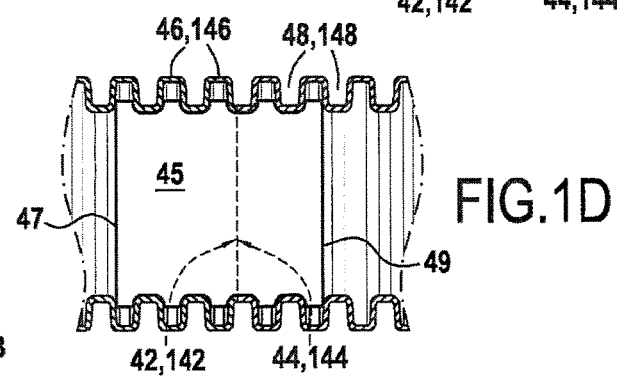

FIG. 1D shows an alternative embodiment of the closure element 45, which presents a section that is shaped so as to fit against the inside profile of the tube 40, 140; thus, and as can be seen in the figure, the closure element 45 may have projecting portions configured to be received in the inside volumes of the crest ring portions 46, 146 so as to further improve assembly of the closure element 45, and consequently further improve secure connection between the first and second ends 42, 44; 142, 144 of the tube 40, 140.

The alternation of crest rings and of trough rings ensures that the tube 40, 140 is flexible so as to enable it, when in the straight-line state, to be curved so as to take on the curved state in order to be closed as a loop, thereby forming the inner tube 30, 130 of toroidal shape that is housed in the internal housing 20 of the wheel 10.

It can be understood that when the tube 40, 140 is in the straight-line state, the longitudinal ends of the tube 40, 140 are constituted by the first and second ends 42, 44; 142, 144; furthermore, the length of the tube 40, 140 is equal to or slightly longer than the circumference of the rim 12 of the wheel 10 so as to make it possible to bring the first and second ends 42, 44; 142, 144 into contact with each other.

By way of example and in non-limiting manner, the tube 40, 140 is made of a thermoplastic elastomer (TPE), which thermoplastic elastomer may be a thermoplastic copolyester or an ether-ester block copolymer.

Figure 2A:
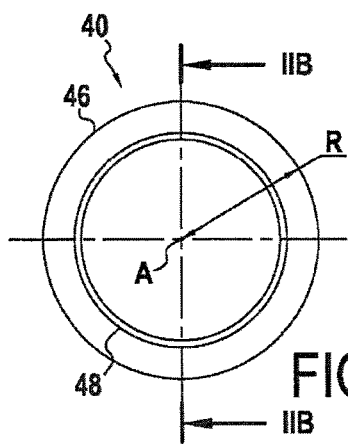
FIGS. 2A and 2B are diagrammatic views in section respectively on a plane across the axis of the tube and on a plane containing the axis of the tube in a first embodiment of a tire inner tube of the present invention.
Figure 2C:
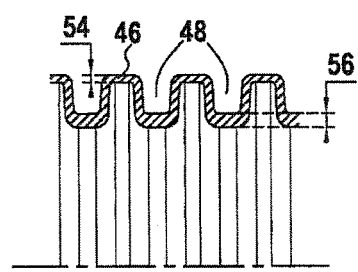
FIG. 2C is a diagrammatic section view on a plane containing the axis of the tube showing a second embodiment of the tire inner tube of the present invention.
Figure 2B:
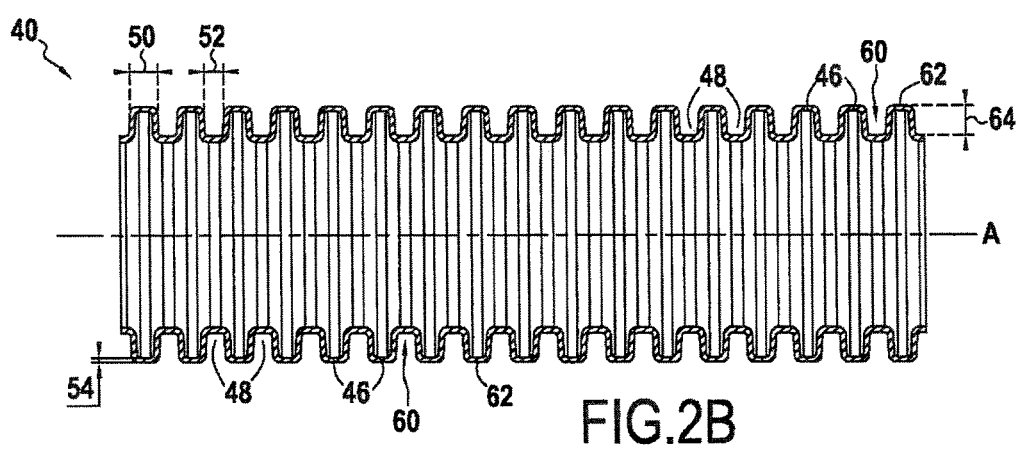

FIGS. 2A and 2B show a first embodiment of the tube 40, the tube 40 in these various figures being shown in its straight-line state.

As can be seen in particular in FIG. 2A, which is a cross-section view on a plane that is transverse and preferably perpendicular to the axis A of the tube 40, each crest ring 46 and each trough ring 48 is substantially circular in shape.

FIG. 2B is a longitudinal section view of the tube 40 on a plane containing the axis A of the tube 40, the tube 40 being in the straight-line state.

The trough rings 48 present respective grooves 60, each groove 60 forming a depression defined by two consecutive crest rings 46.

Each crest ring 46 presents a periphery 62, which, by way of example and in non-limiting manner, is arranged parallel to the bottoms of the grooves 60.

By way of example and in non-limiting manner, the periphery 62 of each crest ring 46 is substantially flat, as is the bottom of the groove 60 of each trough ring 48, thereby defining a section for the trough rings 48. Without going beyond the ambit of the present invention, it is nevertheless possible to devise a tube 40 made up of crest rings 46 and of trough rings 48 in which the peripheries and the respective sections are rounded.

Each crest ring 46 and each trough ring 48 define an axial length 50, 52. The axial length 50 of the crest ring 46 should be understood as being the axial length of the periphery 62 of the crest ring 46, whereas the axial length 52 of the trough ring 48 should be understood as being the axial length of the width of the groove 60 defined between two successive crest rings 46, these axial lengths being considered when the tube 40 is in the straight-line state.

By way of example and in non-limiting manner, in the first embodiment shown in FIGS. 2A and 2B, the axial length 50 of the periphery 62 of a crest ring 46 is strictly greater than the axial length 52 of the groove 60 of a trough ring 48.

Furthermore, each annular groove 60 of the trough ring 48 presents a radial depth 64; the term "radial depth" 64 is used of the groove 60 of a trough ring 48 to mean the distance between the bottom of the groove 60 and the periphery 62 of the crest rings 46 on either side of the corresponding trough ring 48.

In the first embodiment of the tube 40, the radial depth 64 of all of the annular grooves 60 is constant around the circumference of the tube 40.

The crest rings 46 and the trough rings 48 also define a radial thickness 54, 56 that, in this first embodiment and in non-limiting manner, is constant all around the circumference of the tube 40.

FIG. 2C shows a second embodiment of the tube 40 of the present invention.

This second embodiment is characterized by the fact that at least one of the trough rings 48 presents a radial thickness 56 that is greater than the radial thickness 54 of at least one of the crest rings 46.

By way of example and in non-limiting manner, the radial thicknesses 54, 56 are constant around the circumference of the tube 40.

Figure 3A:
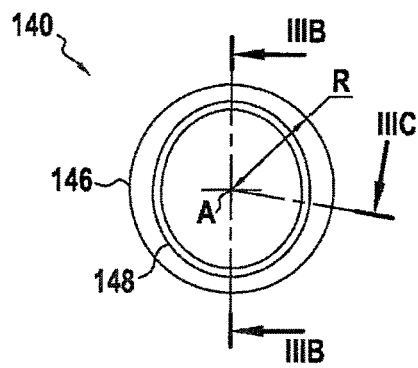
FIGS. 3A, 3B, and 3C are diagrammatic section views respectively on a plane across the axis of the tube and on first and second planes containing the axis of the tube showing a third embodiment of the tire inner tube of the present invention.
Figure 3B:
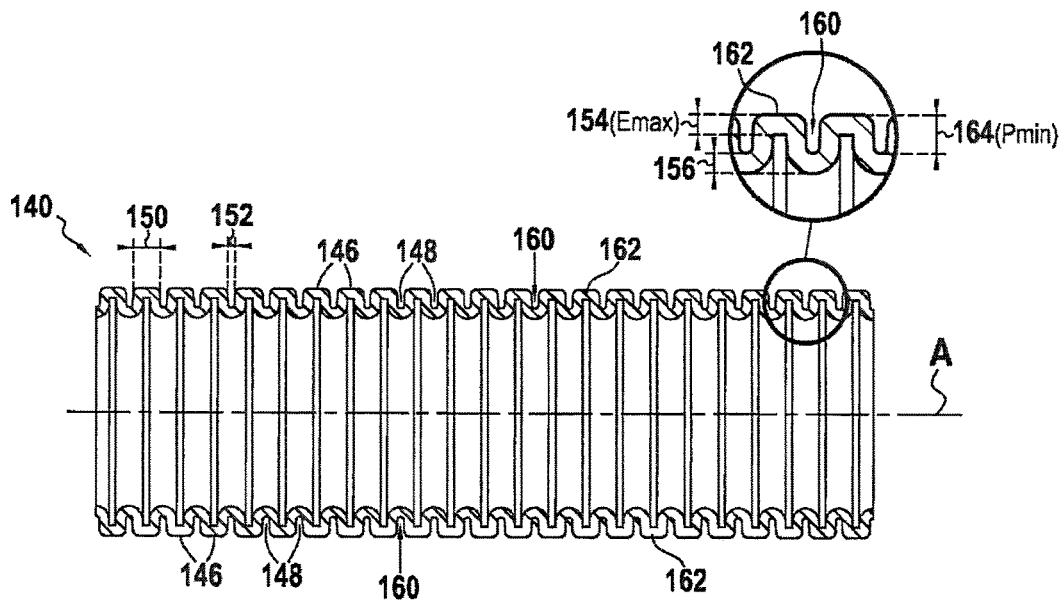
Figure 3C:
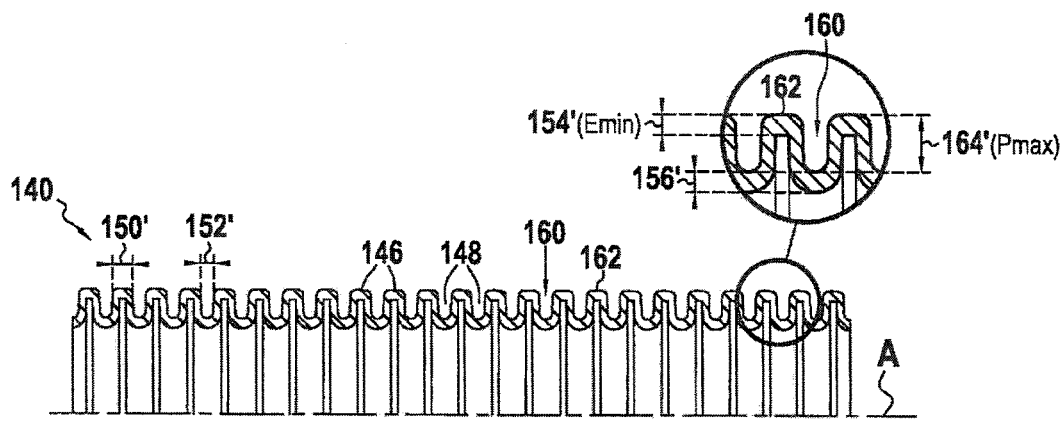

FIGS. 3A, 3B, and 3C show a third embodiment of the tube 140 of the present invention, the tube 140 being shown in these various figures in the straight-line state.

FIG. 3A is a cross-section view of the tube 140 on a plane that extends transversely, and preferably perpendicularly, relative to the axis A of the tube 140.

In similar manner to the first and second embodiments described above with reference to FIGS. 2A, 2B, and 2C, the tube 140 is constituted by alternating crest rings 146 and trough rings 148, the crest rings 146 and the trough rings 148 respectively presenting peripheries 162 and annular grooves 160.

The crest rings 146 are also substantially circular in shape, whereas, as can be seen more clearly from the description of FIGS. 3B and 3C, the trough rings 148 present a shape that is oval, by way of example and in non-limiting manner.

In addition, the peripheries 162 of the crest rings 146 are substantially flat, whereas the sections of the trough rings 148 as constituted by the bottoms of the grooves 160 are rounded.

FIGS. 3B and 3C are diagrammatic longitudinal section views of the tube 140 on respective first and second planes, the first and second planes both containing the axis A of the tube 140.

As shown in the section view of FIG. 3B on the first plane, and in similar manner to the above-described first and second embodiments, the crest rings 146 and the trough rings 148 define respective first axial lengths 150, 152.

The trough rings 148 also define a first radial depth 164.

In addition, the crest rings 146 and the trough rings 148 define respective first radial thicknesses 154, 156, the first radial thicknesses 154, 156 being defined as the radial thickness of the material of the tube 140 where it forms respectively the crest rings 146 and the trough rings 148.

In the first plane, the section of the tube 140 presents symmetry about the axis A.

Furthermore, the portion of the tube 140 in its straight-line state that is shown in FIG. 3C comprises an alternation of crest rings 146 and of trough rings 148, each defining respective second axial lengths 150', 152' and respective second radial thicknesses 154', 156'. In addition, the trough rings 148 define a second radial depth 164'.

As can be seen in the various figures showing the second embodiment of the tube 140 in the straight-line state, the radial depth 164, 164' of each trough ring 148 varies around the circumference of the tube 140 between a minimum radial depth Pmin constituted by the first radial depth 164, and a maximum radial depth Pmax constituted by the second radial depth 164'. The maximum and minimum radial depths Pmin and Pmax of the trough rings 148 are both reached at two distinct positions around the circumference of the tube 140.

By way of example and in non-limiting manner, in the third embodiment of the tube 140, the distinct positions of the trough rings 148 where the minimum radial depth Pmin is reached are diametrically opposite, whereas the distinct positions of the trough rings 148 where the maximum radial depth Pmax is reached are not diametrically opposite.

It would naturally be possible to devise a tube 140 in which the two distinct positions in which the minimum radial depth Pmin is reached are not diametrically opposite, while the two distinct positions in which the maximum radial depth Pmax is reached are diametrically opposite. It would also be possible to devise a tube 140 in which the maximum and minimum radial depths Pmax and Pmin are each reached in one position only, or indeed in more than two distinct positions around the circumference of the tube 140.

Furthermore, and as shown in the various figures of the second embodiment, the radial thickness 154, 154' of the crest rings 146 varies around the circumference of the tube 140 between a minimum radial thickness Emin constituted by the second radial thickness 154', and a maximum radial thickness Emax constituted by the first radial thickness 154.

Thus, in the third embodiment of the tube 140 and in non-limiting manner, the minimum radial thickness Emin of the crest rings 146 is reached in the position of the circumference of the tube where the maximum radial depth Pmax of the trough rings 148 is reached; conversely, the maximum radial thickness Emax of the crest rings 146 is reached in the position of the circumference of the tube 140 where the minimum radial depth Pmin of the trough ring 148 is reached.

In this third embodiment, the tube 140 thus has two distinct and diametrically opposite positions in which the maximum radial thickness Emax of the crest rings 146 is reached, and two distinct positions that are not diametrically opposite where the minimum radial thickness Emin of the crest rings 146 is reached.

In addition, in this example and in non-limiting manner, the radial thickness 156, 156' of the trough rings 148 may also vary around the circumference of the tube 140.

Furthermore, and in similar manner to the first and second embodiments as described above, the first and second axial lengths 150, 150' of the crest rings 146 may, for example and in non-limiting manner, be greater than the first and second axial lengths 152, 152' respectively of the trough rings 148.

It is also possible to devise a tube 140 in which the first and second axial lengths 150, 150' of the crest rings 146 are equal, and the first and second axial lengths 152, 152' of the trough rings 148 are also equal.

FIG. 4 shows a vehicle 200, specifically a bicycle, comprising a frame 202, a pedal set 204, a front travel member 206 and a rear travel member 208, the rear travel member 208 including a wheel 10 of the present invention.

The rear travel member 208 also has a hub 210 to which the rim 12 of the wheel 10 is fastened. The axis of the torus defined by the inner tube 30, 130 made from the tube 40, 140, which is then in its curved state, coincides with the axis of the hub 210.

As shown in FIG. 4, the wheel 10 includes an inspection port 70 formed in the first lateral margin 18 of the running device 14; for example and in non-limiting manner, the inspection port 70 may be in the form of a substantially rectilinear window.

The inspection port 70 as formed in this way makes it possible to see the inner tube 30, 130 arranged in the internal housing of the wheel 10.

Without going beyond the ambit of the present invention, it is also possible to emphasize the zone of the first lateral margin 18 in which the inspection port 70 is formed by coloring said zone.

The inner tube 30, 130 is thus arranged between the contact surface 16 of the running device 14 of the wheel 10 and the rim 12, and constitutes a flexible structure enabling the rear travel member 208 to be set into rotation by the pedal set 204 in order to cause the vehicle 200 to move.

The inner tube 30, 130 thus takes the place of an inflatable inner tube of the kind used in conventional manner for mounting in vehicle travel members.

When the wheel 10 includes the tube 140 of the third embodiment described above, it is particularly advantageous for one of the positions of the circumference of the tube 140 where the minimum radial depth Pmin is reached to be placed facing the contact surface 16 of the running device 14, so as to benefit from best flexibility properties.

Figure 5:
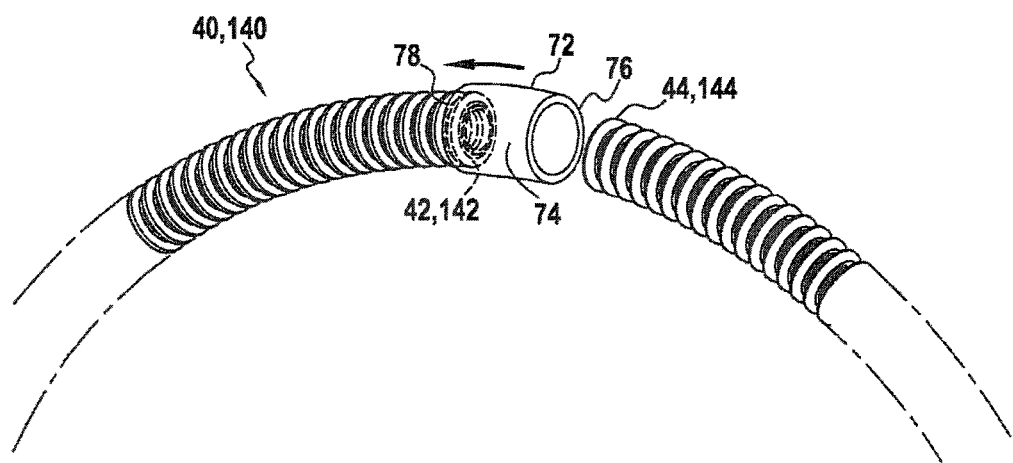
FIG. 5 is a diagram showing an example of a protective sleeve mounted on one end of the tube of the present invention.

FIG. 5 shows the tube 40, 140 in an intermediate state between its straight-line state and its curved state, prior to being placed in the internal housing of the running device 14 of the wheel 10, a protective sleeve 72 being mounted on the first end 42, 142 of the tube 40, 140.

The protective sleeve 72 presents a cylindrical body defining an internal cavity 74 and including first and second opposite ends 76 and 78, the first end 76 being closed, for example and in non-limiting manner.

The dimensions of the internal cavity 74 of the protective sleeve 72 are equal to or slightly greater than the dimensions of the tube 40, 140 so that the sleeve 72 can be engaged on the first end 42, 142 by being slid along the tube 40, 140, as shown in FIG. 5, until the first end 76 of the protective sleeve 72 comes into abutment against the first end 42, 142 of the tube 40, 140.

By way of example and in non-limiting manner, the protective sleeve 72 may be made of a transparent material so as to protect the first end 42, 142 of the tube 40, 140 placed facing the inspection port 70, while still leaving it visible.

The entire description above is given by way of example and does not limit the invention.

In particular, and as mentioned when describing the third embodiment of the tube 140, the various parameters concerning radial depth, axial length, and radial thickness of the trough rings and of the crest rings may vary around the circumference of the tube 140 in various different ways.

In addition, it is also possible, without going beyond the ambit of the present invention, to devise a tube made up of alternating crest rings and trough rings in which the rings present different dimensions going from one ring to another.

As mentioned above, the tube is made to be flexible by having alternating trough rings and crest rings, thereby enabling the tube to be curved so that it can be placed in the internal housing of running devices of different dimensions, thus enabling the tube to be used to fit wheels of different sizes as a function of the axial length of the tube.

Furthermore, although the tube of the present invention is described by way of example as being fitted to a bicycle, it can also be used for any other type of vehicle, such as a scooter, a motor vehicle, or some other kind of vehicle.

The invention claimed is:

1. A toroidal inner tube, in the form of a flexible corrugated tube having a central axis and that is curved to form a closed loop with annular grooves along an entire circumference of a cross-section of the closed loop, the flexible corrugated tube comprising alternating crest rings and trough rings presenting radial thicknesses, wherein the crest rings and trough rings are defined relative to the central axis of the flexible corrugated tube, the flexible corrugated tube presenting a radius and an axis and, when measured in a plane perpendicular to the axis of the flexible corrugated tube, the radial thickness of at least one of the crest rings is less than the radial thickness of at least one of the trough rings.

2. The inner tube according to claim 1, wherein each trough ring defines an annular groove that presents a radial depth, the radial depth of at least one of the trough rings varying around the circumference of the flexible corrugated tube.

3. The inner tube according to claim 2, wherein, when measured in a plane extending transversely relative to the axis of the flexible corrugated tube, at least one of the trough rings presents a shape that is oval.

4. The inner tube according to claim 2, wherein the radial depth of at least one of the trough rings varies between a maximum radial depth and a minimum radial depth, at least one of the maximum and minimum radial depths being reached at at least two distinct positions around the circumference of the flexible corrugated tube.

5. The inner tube according to claim 4, wherein when the minimum radial depth is reached at at least two distinct positions around the circumference of the flexible corrugated tube, said at least two distinct positions of the trough ring where the minimum radial depth is reached are diametrically opposite.

6. The inner tube according to claim 4, wherein when the maximum depth is reached at at least two distinct positions around the circumference of the flexible corrugated tube, said at two distinct positions of the trough ring where the maximum radial depth is reached are not diametrically opposite.

7. The inner tube according to claim 4, wherein the radial thickness of at least one of the crest rings varies between a maximum radial thickness and a minimum radial thickness, the maximum radial thickness being reached at at least one of the circumferential positions of the flexible corrugated tube where the minimum radial depth of the trough ring is reached.

8. The inner tube according to claim 7, wherein the minimum radial thickness of the at least one of the crest rings is reached at at least one of the circumferential positions of the flexible corrugated tube where the maximum radial depth of the trough ring is reached.

9. The inner tube according to claim 2, wherein the groove of at least one of the trough rings presents an axial length and, at least one of the crest rings presents a periphery having an axial length that is strictly greater than the axial length of the groove of at least one of the trough rings, when measured in a plane containing the axis of the flexible corrugated tube.

10. The inner tube according to claim 1, wherein the radial thickness of at least one of the crest rings varies around the circumference of the flexible corrugated tube.

11. The inner tube according to claim 1, wherein, when measured in a plane perpendicular to the axis of the flexible corrugated tube, the radial thickness of at least one of the trough rings varies around the circumference of the flexible corrugated tube.

12. The inner tube according to claim 1, wherein, at least one of the crest rings presents a periphery that is substantially flat, when measured in a plane containing the axis of the flexible corrugated tube.

13. The inner tube according to claim 1, wherein at least one of the trough rings presents a section that is rounded, when measured in a plane containing the axis of the flexible corrugated tube.

14. The inner tube according to claim 1, wherein the flexible corrugated tube is made of thermoplastic elastomer (TPE).

15. A wheel configured to be mounted on a vehicle wherein the wheel comprises:
a running device comprising a contact surface configured to come into contact with the ground during travel of the vehicle, and defining an internal housing; and
an inner tube in the form of a flexible corrugated tube having a central axis and that is curved to form a closed loop, the flexible corrugated tube comprising alternating crest rings and trough rings presenting radial thicknesses, wherein the crest rings and trough rings are defined relative to the central axis of the flexible corrugated tube, each trough ring defining an annular groove that presents a radial depth, the flexible corrugated tube presenting a radius and an axis and, when measured in a plane perpendicular to the axis of the flexible corrugated tube, the radial thickness of at least one of the crest rings is less than the radial thickness of at least one of the trough rings, the inner tube being arranged in the internal housing of the running device.

16. The wheel according to claim 15, wherein the radial depth of at least one of the trough rings varies between a maximum radial depth and a minimum radial depth, at least one of the maximum and minimum radial depths being reached at at least two distinct positions around the circumference of the flexible corrugated tube and wherein one of the circumferential positions of the trough ring where the minimum radial depth is reached is arranged facing the contact surface of the running device.

17. The wheel according to claim 15, wherein the running device includes a first lateral margin and a second lateral margin extending from the contact surface, an inspection port being formed in either one of the first and second lateral margins of the running device.

18. The wheel according to claim 17, wherein the wheel also includes a protective sleeve arranged around the flexible corrugated tube the inner tube and arranged facing the inspection port.

19. The wheel according to claim 18, wherein the flexible corrugated tube forming the inner tube has first and second longitudinal ends and in that the protective sleeve has a closed first end, the protective sleeve being arranged at the first longitudinal end of the flexible corrugated tube, the closed first end being arranged against the second longitudinal end.

20. A toroidal inner tube, wherein the toroidal inner tube is in the form of a flexible corrugated tube that is curved to form a closed loop, the tube comprising alternating crest rings and trough rings presenting radial thicknesses, each trough ring defining an annular groove that presents a radial depth, the tube presenting a radius and an axis and, when measured in a plane perpendicular to the axis of the tube, the radial thickness of at least one of the crest rings is less than the radial thickness of at least one of the trough rings.

\* \* \* \* \*